(12) United States Patent
Chua et al.

(10) Patent No.: US 9,949,585 B2
(45) Date of Patent: Apr. 24, 2018

(54) STAND FOR SUPPORTING A GARMENT HANGER

(71) Applicant: KONINKLIJKE PHILIPS N.V., Eindhoven (NL)

(72) Inventors: Hee Keng Chua, Eindhoven (NL); Chiak Ngee Dominic Lim, Eindhoven (NL); Valiyambath Krishnan Mohankuma, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/025,298

(22) PCT Filed: Sep. 22, 2014

(86) PCT No.: PCT/EP2014/070080
§ 371 (c)(1),
(2) Date: Mar. 28, 2016

(87) PCT Pub. No.: WO2015/044066
PCT Pub. Date: Apr. 2, 2015

(65) Prior Publication Data
US 2016/0220052 A1    Aug. 4, 2016

(30) Foreign Application Priority Data

Sep. 30, 2013    (EP) .................................... 13186608

(51) Int. Cl.
*A47F 7/19*    (2006.01)
*A47F 7/24*    (2006.01)
(Continued)

(52) U.S. Cl.
CPC ............ *A47G 25/0664* (2013.01); *A47F 7/19* (2013.01); *A47F 7/24* (2013.01); *A47G 25/06* (2013.01);
(Continued)

(58) Field of Classification Search
CPC .. A47F 7/19; A47F 7/24; A47G 25/06; A47G 25/0664; A47G 25/14; A47G 25/32;
(Continued)

(56) References Cited

U.S. PATENT DOCUMENTS 4,139,102 A    2/1979  Winton
5,018,627 A *  5/1991  Moore ............... A47G 25/0692
                                                              206/291
(Continued)

FOREIGN PATENT DOCUMENTS

CN    2078760 U    6/1991
CN    2336635 Y    9/1999
(Continued)

OTHER PUBLICATIONS http://www.ebay.co.uk/itm/Povos-1600W-1-8L-Pro-Fabric-Garment-Steamer-w-Clothing-Hanger-Trouser-Clamp-/400487831584.

*Primary Examiner* — Michael E Barr
*Assistant Examiner* — Levon J Shahinian

(57) ABSTRACT

The present application relates to a stand for supporting a garment hanger. The stand comprises a supporting element (14,22,32) on which a garment hanger is hung, and a clamp (8) operable to releasably support the garment hanger in a fixed orientation after the garment hanger has been hung on said supporting element (14,22,32).

20 Claims, 4 Drawing Sheets

(51) Int. Cl.
*A47G 25/06* (2006.01)
*A47G 25/14* (2006.01)
*A47G 25/32* (2006.01)
*D06F 59/02* (2006.01)
*D06F 73/00* (2006.01)
*F16B 1/00* (2006.01)
*F16B 2/06* (2006.01)
*F16B 2/18* (2006.01)
*F16M 11/04* (2006.01)

(52) U.S. Cl.
CPC ............. *A47G 25/14* (2013.01); *A47G 25/32* (2013.01); *D06F 59/02* (2013.01); *D06F 73/00* (2013.01); *F16B 1/00* (2013.01); *F16B 2/065* (2013.01); *F16B 2/18* (2013.01); *F16M 11/041* (2013.01); *F16B 2001/0035* (2013.01)

(58) Field of Classification Search
CPC .. D06F 59/02; D06F 73/00; F16B 1/00; F16B 2/065; F16B 2/18; F16B 2001/0035; F16M 11/041
USPC .......................... 68/5 R; 206/291; 211/7, 123
See application file for complete search history.

(56) References Cited

U.S. PATENT DOCUMENTS

| | | | |
|---|---|---|---|
| 5,697,508 A | 12/1997 | Rifkin | |
| 6,371,313 B1* | 4/2002 | Walter | A47F 5/10 211/105.1 |
| 2004/0163184 A1* | 8/2004 | Waldron | D06F 73/02 8/149.1 |
| 2006/0065682 A1* | 3/2006 | Keller | A47G 25/1407 223/88 |
| 2006/0101867 A1 | 5/2006 | Kleker | |

FOREIGN PATENT DOCUMENTS

| | | |
|---|---|---|
| CN | 201216453 Y | 4/2009 |
| CN | 201452717 U | 5/2010 |
| CN | 201952664 U | 8/2011 |
| CN | 102188145 A | 9/2011 |
| CN | 202380308 U | 8/2012 |
| CN | 202430541 U | 9/2012 |
| DE | 2840880 A1 | 3/1980 |
| EP | 0423993 A1 | 4/1991 |
| EP | 1444929 A1 | 8/2004 |
| GB | 2336106 A | 10/1999 |
| WO | 2007113476 A1 | 10/2007 |

* cited by examiner

STAND FOR SUPPORTING A GARMENT HANGER

This application is the U.S. National Phase application under 35 U.S.C. § 371 of International Application No. PCT/EP2014/070080, filed on Sep. 22, 2014, which claims the benefit of International Application No. 13186608.9 filed on Sep. 30, 2013. These applications are hereby incorporated by reference herein.

FIELD OF THE INVENTION

This invention relates to a stand for supporting a garment hanger, particularly but not exclusively a stand for supporting a garment hanger during treatment of a garment.

BACKGROUND OF THE INVENTION

Garment steamers may include a stand which has a hook on which a garment hanger may be supported to hold a garment during steaming. However, when a garment hanger is supported on a hook, the position of the garment hanger, and the garment, is not stable. As a user steams the garment they will inevitably need to move, pull and/or lift the garment to access different parts and remove wrinkles. As the garment is moved the position of the garment and the garment hanger will vary and this creates difficulties when trying to remove wrinkles from the garment. Moreover, the garment hanger may become detached from the hook during steaming.

Other garment steamers, for example that disclosed in CN202380308U, provide a hanger that is fixed to a stand. This provides garments with more support and eases the steaming process. However, it is inconvenient for a user to hang the garment on the hanger and remove it after steaming. Moreover, the fixed hanger may not be the appropriate shape and size for all garments, for example a garment hanger designed for a shirt may not be suitable for supporting a pair of trousers or a skirt.

It is known from EP1444929 to provide a stand for supporting a garment hanger, comprising a supporting element on which a garment hanger is hung.

SUMMARY OF THE INVENTION

It is an object of the invention to provide a stand for supporting a garment hanger which substantially alleviates or overcomes the problems mentioned above.

The invention is defined by the independent claims; the dependent claims define advantageous embodiments.

A stand for supporting a garment hanger according to the present invention is characterised by a clamp operable to releasably support said garment hanger in a fixed orientation after said garment hanger has been hung on said supporting element.

The clamp to support a garment hanger on the stand enables a user to use a garment hanger that is most convenient for the garment and for the task. For example, the user may wish to keep the garment on its own garment hanger to avoid having to move the garment between different garment hangers. Also, the user is able to select a garment hanger that is most suitable for that particular garment, for example a skirt will require a different garment hanger to a shirt or a pair of trousers.

Moreover, by supporting the garment hanger in a fixed orientation on the stand, the user is able to move, pull and handle the garment without the garment hanger moving around or becoming dislodged. This may be beneficial, for example, if the stand were used while treating a garment with steam, as the user is able to pull and move the garment to remove wrinkles and access different parts of the garment. The fixed orientation of the garment hanger allows the user to pull against the hanger to straighten the garment, which helps to remove wrinkles.

The clamp may comprise first and second clamping surfaces and a supporting element on which a garment hanger can be hung, the supporting element being disposed intermediate the first and second clamping surfaces.

In this way, the supporting element can support the garment hanger prior to the clamp being closed onto the garment hanger, so that a user is able to hang the garment hanger on the stand and then apply the clamp.

The first and second clamping surfaces may be moveable such that the distance between the first and second surfaces is continuously adjustable.

By providing the first and second clamping surfaces with continuously adjustable positions, the clamp and the stand are able to support a variety of garment hangers having varying sizes and thicknesses. Therefore, a user is able to use a greater variety of garment hangers and is able to select the most appropriate for the garment and the task.

The clamp may comprise a threaded protrusion that engages with a threaded hole such that the first and second clamping surfaces are moveable by rotation of the threaded shaft relative to the threaded hole.

The threaded connection allows the distance between the first and second clamping surfaces to be continuously adjustable, by screwing the threaded shaft into, or out of, the threaded hole. Therefore, a variety of garment hangers with varying sizes and shapes can be clamped to the stand.

The thread angle of the threaded protrusion may be between 5 degrees and 9 degrees. This thread angle is advantageous because it provides a self-locking configuration for the clamp.

A shaft may protrude from a body of the clamp and a plate may be slidably mounted to the shaft such that the first and second clamping surfaces are moveable by sliding the plate along the shaft.

The sliding connection between the plate and the shaft allows the distance between the first and second clamping surfaces to be continuously adjustable, by sliding the plate along the shaft towards, or away from, the body. Therefore, a variety of garment hangers with varying sizes and shapes can be clamped to the stand.

The clamp may further comprise: an elastic element disposed intermediate the body and the plate to urge the plate away from the body; and a cam element disposed on an end of the shaft; wherein the cam element comprises a cam surface configured to push the plate towards the body upon rotation of the cam element.

The elastic element and the clamp provide opposing forces that define the position of the plate along the shaft. Therefore, the position of the plate along the shaft is determined by the rotational position of the cam element. Also, the elastic element acts to push the clamp towards an open position so that the clamp opens itself once the cam element has been released. The cam element is rotatable to push the plate towards to the body so that a garment hanger disposed between the first and second clamping surfaces is clamped in position, with the spring element in a compressed state and the cam element in a stable position. This arrangement enables the distance between the first and second clamping surfaces to be continuously adjustable so that the clamp can be used for a variety of different garment hangers having varying size and thickness.

A shaft may protrude from a plate and the shaft may be slidably received in an aperture of a body of the clamp such that the first and second clamping surfaces are moveable by sliding the shaft into, and out of, the aperture.

The sliding connection between the plate and the shaft allows the distance between the first and second clamping surfaces to be continuously adjustable, by sliding the shaft into, or out of, the aperture in the body. Therefore, a variety of garment hangers with varying sizes and shapes can be clamped to the stand.

The body may further comprise a magnet and the shaft may comprise a magnetic material such that the plate is biased towards a closed position by a magnetic force.

The magnet acts to urge the plate towards a closed position by pulling and/or pushing the shaft into the aperture. A user is able to open the clamp by pulling against the magnetic force to move the plate away from the body, allowing a garment hanger to be placed in the clamp. Then, when the user releases the plate, the magnet will urge the plate into the closed position to clamp the garment hanger in a fixed orientation. Therefore, a user is easily able to clamp a garment hanger to the stand.

The stand may further comprise a locking element operable to lock the clamp in a closed position during use.

In this way, when the clamp is closed and a garment hanger is clamped to the stand the locking element can be engaged to fix the position of the clamp and prevent it from coming open during use. This is particularly advantageous when using the stand to support heavy garments, as the force provided by the magnet may not be sufficient to hold the clamp closed.

According to another aspect of the present invention, there is provided apparatus for treating a garment comprising the stand described above.

The apparatus for treating a garment may be a garment steamer that further comprises a steam generator and means for applying steam to a garment.

The stand can be used to support a garment during steaming and the fixed orientation of the garment hanger allows a user to pull and move the garment without moving the garment hanger and without risk of the garment hanger coming detached from the stand. This eases the garment steaming process as the garment can more easily be moved to access all areas of the garment and can be pulled with more force to remove wrinkles.

These and other aspects of the invention will be apparent from and elucidated with reference to the embodiments described hereinafter.

BRIEF DESCRIPTION OF THE DRAWINGS

Embodiments will now be described, by way of example only, with reference to the accompanying drawings, in which.

DETAILED DESCRIPTION

Figure 1:
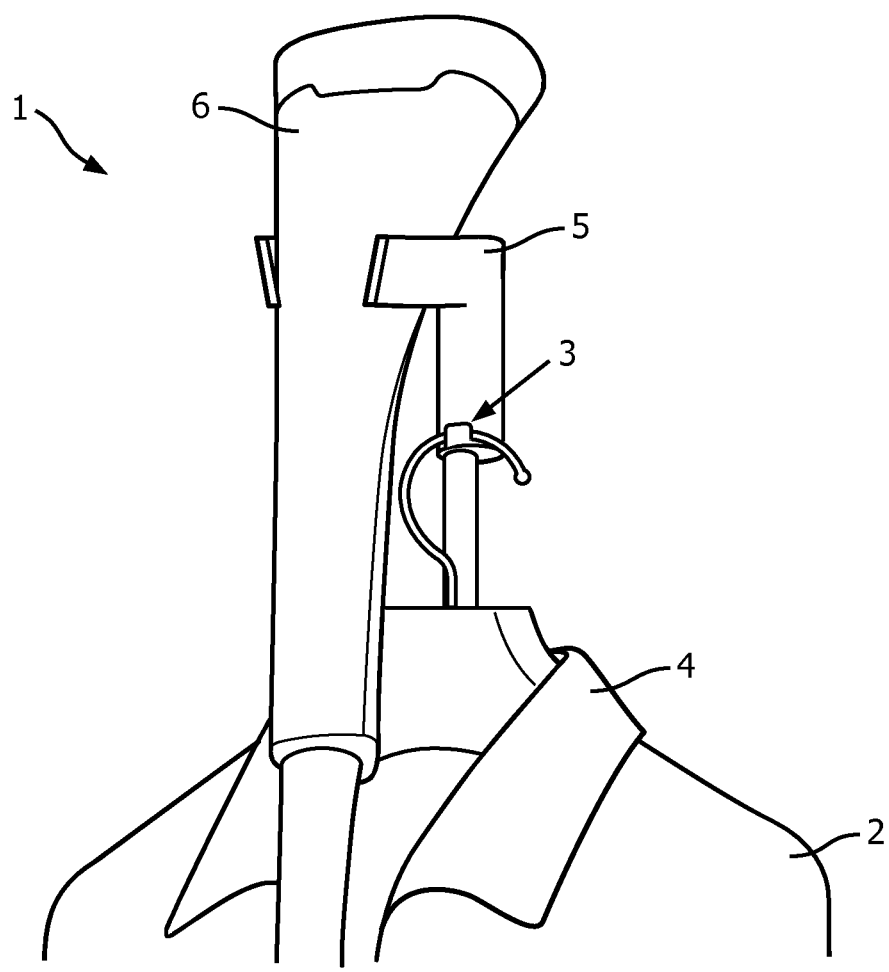
FIG. 1 shows a stand for a garment cleaner that is known from the prior art.

The stand 1 shown in FIG. 1 is part of a known garment steamer and provides supporting means for the garment 2. As shown, the stand 1 of the prior art shown in FIG. 1 includes a hook 3 on which a garment hanger 4 can be hung so that the garment is supported in a hanging position and can be steamed by moving the steamer over the garment 2. Also shown in FIG. 1, the stand 1 includes a bracket 5 to support the steamer head 6 whilst it is not being used.

As previously explained, when a garment 2 is supported as shown in FIG. 1 the garment hanger 4 and the garment 2 will move around during steaming. More specifically, the garment hanger 4 will be able to rotate, swing, twist and move up and down while the steamer head 6 is moved over the garment 2 and the user pulls and moves the garment 2. There is even a possibility that the garment hanger 4 can come detached from the hook 3.

FIGS. 2, 3a, 3b, 4a and 4b show embodiments of a stand 7 that provides a means for clamping the garment hanger 4 to the stand 7 to provide a secure and easy to use support for the garment. The clamping ensures that the garment hanger 4 does not move or fall from the stand 7 during steaming of the garment. This makes steaming the garment easier as the garment can be pulled and moved while using the clamped garment hanger 4 as a rigid anchor.

Figure 2:
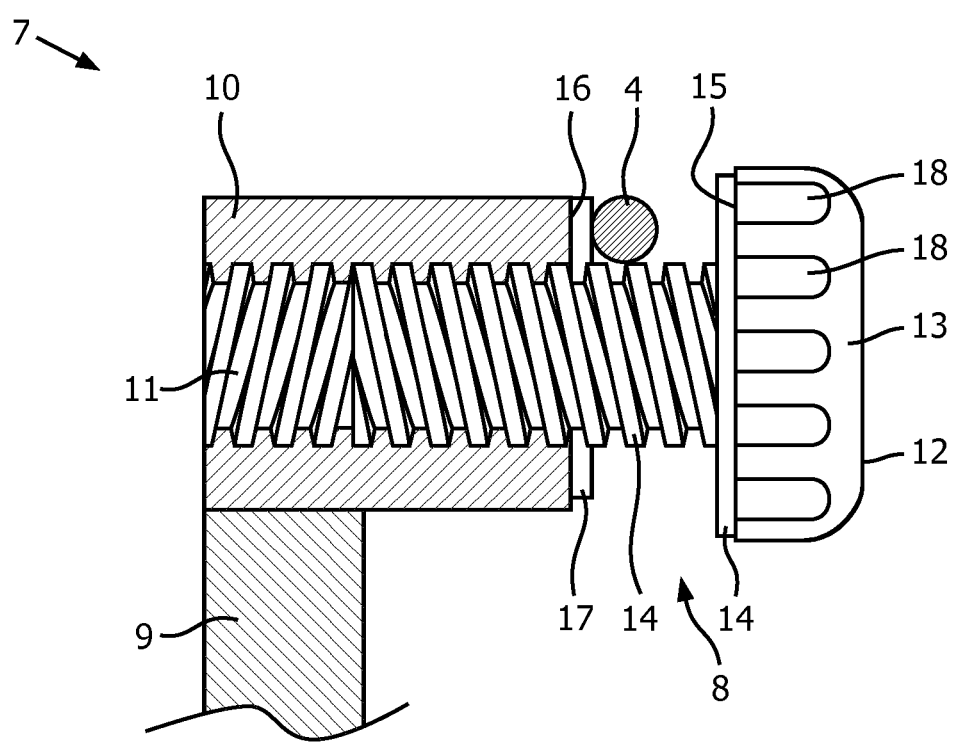
FIG. 2 shows a cross-section of a clamp of a first embodiment of a stand for supporting a garment hanger.

The embodiment shown in FIG. 2 has a clamp 8 which is mounted to an arm 9 of the stand 7. The clamp 8 has a body 10 which comprises a threaded hole 11 that extends through the body 10. In this embodiment, the threaded hole 11 extends entirely through the body 10 but it will be appreciated that the threaded hole 11 may only extend partially into the body 10, or the thread of the threaded hole 11 may not extend the entire length of the threaded hole 11. The clamp 8 further includes a clamp element 12 which comprises a cap 13 and a threaded shaft 14. As shown in FIG. 2, the threaded shaft 14 is configured to engage with the threaded hole 11 of the body 10 such that the clamp element 12 can be attached to the body 10.

The diameter of the cap 13 of the clamp element 12 is larger than the diameter of the threaded shaft 14 such that a first clamping surface 15 is formed by the annular portion of the cap 13 around the threaded shaft 14. Moreover, the body 10 and the threaded hole 11 are configured to form a second clamping surface 16 around the threaded hole 11. Therefore, as shown in FIG. 2, a garment hanger 4 positioned between the first and second clamping surfaces 15, 16 can be secured in place by screwing the clamp element 12 into the threaded hole 11 until the garment hanger 4 is clamped between the first and second clamping surfaces 15, 16.

As shown, the threaded shaft 14 of the clamp element 12 acts as a supporting element on which the garment hanger 4 can be hung. In this way, the garment hanger 4 (and garment) can be hung on the threaded shaft 14 and then the clamp element 12 can be screwed into the body 10, reducing the distance between the first and second clamping surfaces 15, 16, until the garment hanger 4 is clamped.

The garment hanger 4 can be hung on the threaded shaft 14 using a hook part that a garment hanger 4 typically comprises. Alternatively, any part of a garment hanger 4 may be positioned on the threaded shaft 14, or at least positioned between the first and second clamping surfaces 15, 16, to clamp the garment hanger 4 to the stand 7.

By clamping a portion of the garment hanger 4 between the first and second clamping surfaces 15, 16 the garment hanger 4 is prevented from moving in any direction while reasonable force is applied to the garment and garment hanger 4 during steaming. The clamp 8 holds the garment hanger 4 in a fixed orientation which allows a user to pull, move, fold and generally handle a garment while steaming. Furthermore, the clamp 8 is suitable for clamping any type of garment hanger, so long as there is a portion that can be supported on the threaded shaft 14 or clamped between the first and second clamping surfaces 15, 16.

Also shown in FIG. 2, the first and second clamping surfaces 15, 16 may be provided with a surface coating, or a material 17 may be attached to the first and second clamping surfaces 15, 16. The material 17 or surface coating may be soft and deformable so that the first and second clamping surfaces 15, 16 can deform around the portion of the garment hanger 4 that is being clamped. This will provide better clamping and reduce the chance of the garment hanger 4 coming loose. Furthermore, this will prevent the garment hanger 4 or clamp 8 from becoming damaged, in particular the first and second clamping surfaces 15, 16 are protected against scratches and indentations that may reduce the effectiveness of the clamp 8. The material 17 applied to the first and second clamping surfaces 15, 16 may be a polymer or a foam or another soft and deformable material.

As shown in FIG. 2, the cap 13 of the clamp element 12, in particular the circumferential surface of the cap 13, may be provided with grooves 18, knurling or other features that allow a user to easily grip the cap 13 for rotation to close and open the clamp 8.

The clamp 8 may be provided with means, for example a stopper (not shown), to prevent the cap from being completely unscrewed from the threaded shaft 1.

In one embodiment, the thread angle ($\Phi_F$) of the threaded shaft 14 and threaded hole 11 may be selected such that it is smaller than the friction angle of the thread (where $\Phi_f$=arctan $f_S$, where $f_S$ is the friction coefficient of the material). In this way, the clamp 8 has a self-locking configuration such that when the clamp 8 is tightened against the garment hanger 4 the clamp element 12 is secured in place by the frictional force acting on the thread such that the thread is self-locking. In one example the threaded shaft 14 and threaded hole 11 have a thread angle of between 5 degrees and 9 degrees. The thread angle is measured from a plane which is perpendicular to the longitudinal direction of the threaded shaft 14.

In an alternative embodiment, the threaded shaft 14 may extend from the body 10 and the cap 13 of the clamp element 12 may be provided with a threaded hole so that the cap 13 can be screwed onto the threaded shaft 14. In this way, the clamp works in the same manner as described above. In another similar example, the threaded hole may comprise a helical cam surface and the shaft may comprise a cam follower that protrudes from a side of the shaft to engage the helical cam surface. Therefore, the rotational movement of the shaft required to move the first and second surfaces between the open and closed positions can be reduced by providing the helical cam surface with a high pitch.

It will be appreciated that the clamp 8 described with reference to FIG. 2 can be used with a variety of different garment hangers 4. The distance between the first and second clamping surfaces 15, 16 is continuously adjustable so that the clamp 8 can be used to secure garment hangers 4 having different thickness and size. Therefore, a user does not need to move a garment onto an inbuilt hanger or onto a specific hanger prior to securing the garment hanger 4 to the stand 7 and commencing steaming.

Similarly to the embodiment described with reference to FIG. 2, the embodiment shown in FIGS. 3a and 3b has a clamp 8 with a body 10 which is mounted to an arm 9 of the stand 7. First and second clamping surfaces 15, 16 are defined on the clamp element 12 and body 10 respectively, and a garment hanger 4 can be clamped between the first and second clamping surfaces 15, 16 by moving the clamp element 12 relative to the body 10.

Figure 3A:
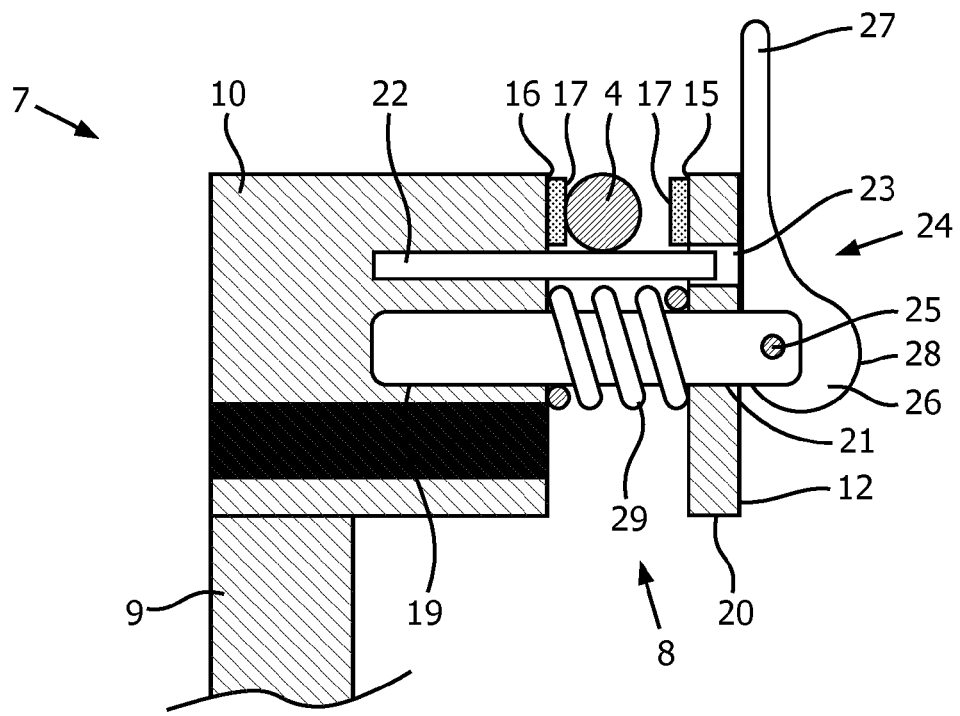
FIG. 3a shows a cross-section of a clamp of a second embodiment of a stand for supporting a garment hanger, with the clamp in an open position.
Figure 3B:
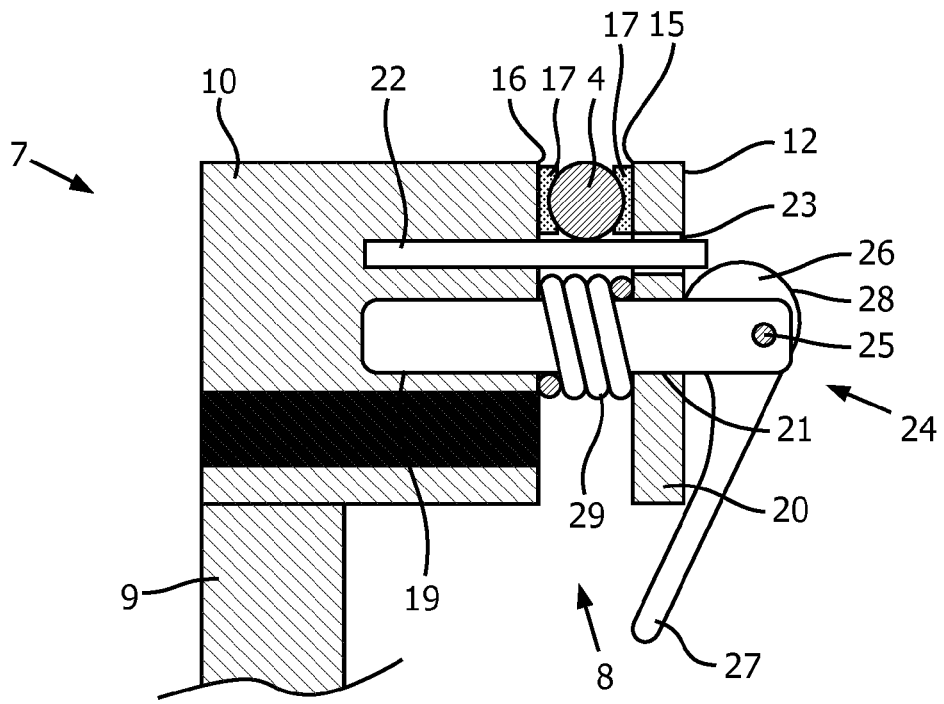
FIG. 3b shows the clamp of the stand for supporting a garment hanger of FIG. 3a in a closed position.

In particular, as shown in FIGS. 3a and 3b, the clamp element 12 of this embodiment comprises a shaft 19 that is fixably mounted to the body 10 and slidably connected to a plate 20 via a first aperture 21 in the plate 20. The clamp also comprises a supporting element 22 that is also fixably mounted to the body 10 and slidably connected to the plate 20 via a second aperture 23, in a similar manner to the shaft 19. In this way, the plate 20 is able to slide, relative to the body 10, along the shaft 19 and the supporting element 22.

Also shown in FIGS. 3a and 3b, the shaft 19 extends through the first aperture 21 in the plate 20 and a cam element 24 is fixed to the end of the shaft 19 such that the plate 20 is disposed between the cam element 24 and the body 10. The cam element 24 is pivotally mounted to the end of the shaft 19 such that the cam element 24 pivots about a pin 25 with an axis that is perpendicular to the longitudinal direction of the shaft 19. In one example, the cam element 24 is received in a recess in the end of the shaft 19, between two opposing walls, and the pin 25 extends through the opposing walls and the cam element 24 to provide a pivot. In other embodiments, the cam element 24 may be pivotally mounted to a protrusion or other shaped recess on the end of the shaft 19.

The cam element 24 comprises an eccentric cam portion 26 and a lever 27. The eccentric cam portion 26 has a curved cam surface 28 which abuts against the plate 20 and the pin 25 extends through the eccentric cam portion 26 in a non-central position. The lever 27 extends from one side of the eccentric cam portion 26 for a user to push or pull in order to rotate the cam element 24 and cause the curved cam surface 28 to push the plate 20 towards the body 10, thereby changing the distance between the first and second clamping surfaces 15, 16.

Also shown in FIGS. 3a and 3b, a spring element 29 is positioned between the body 10 and the plate 20. In this example, the spring element 29 is positioned over the shaft 19. The spring element 29 urges the plate 20 away from the body 10, along the shaft 19 and supporting element 22, to the point that the plate 20 abuts the cam element 24, as shown in FIG. 3a. In this position the clamp 8 is in an open position. Therefore, the cam element 24 and the spring element 29 oppose each other to define the position of the plate 20 along the shaft 19 and thereby define the distance between the first and second clamping surfaces 15, 16.

A garment hanger 4 can be hung from the supporting element 22 that extends between the body 10 and the plate 20. The hook part of a garment hanger 4 is shown in FIG. 3a and as shown the garment hanger 4 is supported on the supporting element 22, away from the spring element 29 which is disposed on the shaft 19. However, it will be appreciated that the supporting element 22 is optional and the garment hanger 4 may be directly supported on the shaft 19. It will also be appreciated that the spring element 29 may be disposed elsewhere on the clamp 8, between the body 10 and the plate 20 and not necessarily on the shaft 19 as shown. The spring element 29 is an elastically deformable component that exerts a force when placed under compression. In this example, the spring element 29 is a compression spring.

In the open position shown in FIG. 3a the cam element 24 is disposed such that a first part of the curved cam surface 28 abuts the plate 20, and the plate 20 and the body 10 are at a maximum separation. As shown in FIG. 3a, the first part of the curved cam surface 28 may be formed on a part of the lever 27, such that the lever abuts the plate 20 when the clamp 8 is in the open position. Alternatively, the first part of the curved cam surface 28 may comprise a flat portion that abuts the plate 20 when the cam element 24 is in the open position. In any case, when the first part of the cam surface 28 abuts the plate 20 the cam element 24 is in a stable position. When a user grips the lever 27 and rotates the cam element 24 about the pin 25 the curved cam surface 28 moves over the plate 20 and pushes the plate 20 towards the body 10, against the force of the spring element 29.

FIG. 3b shows the closed, clamped, position of the clamp 8 of FIG. 3a. As shown, the profile of the curved cam surface 28 acts to maintain the position of the cam element 24 and prevent it from returning to the open position shown in FIG. 3a under the force of the spring element 29. Therefore, as shown in FIG. 3b, the garment hanger 4 is clamped between the first and second clamping surfaces 15, 16 and the cam element 24 is in a stable position. Friction that acts between the curved cam surface 28 and the plate 20 may prevent the cam element 24 from returning to the open position under the force of the spring element 29.

The curved cam surface 28 has a constantly variable distance from the pin 25 so that as the cam element 24 is rotated the plate 20 is pushed towards the body 10. This allows garment hangers 4 having varying size and thickness to be supported by the clamp 8. Once the cam element 24 reaches a certain point of rotation about the pin 25 the cam element 24 will reach a stable position and will not be able to rotate back to the open position unless the lever 27 is pulled or lifted in a direction away from the plate 20. Any rotation beyond this point of rotation results in a stable position for the cam element 24 and this allows different size garment hangers 4 to be clamped. Moreover, in an alternative embodiment, the cam surface 28 may also comprise one or more steps such that one or more discrete stable positions are provided for the cam element 24.

In an alternative embodiment, the shaft 19 is adjustably mounted to the body 10 to allow the distance between the second clamping surface 16 on the body and the clamp element 24 on the shaft 19 to be adjusted. For example, the shaft 19 may be threadingly received in a hole in the body 10 so that the distance between the second clamping surface 16 and the cam element 24 can be further increased or decreased by rotating the cam element 24 and the shaft 19. This adjustable movement allows the clamp 8 to be used for garment hangers 4 having a greater variety of size and thickness.

To open the clamp 8 and release the garment hanger 4, the lever 27 is moved back towards the position shown in FIG. 3a and the spring element 29 will push the plate 20 away from the body 10 to release the clamp 8.

As with the embodiment described with reference to FIG. 2, the first and second clamping surfaces 15, 16 may be provided with a surface coating or a material 17 may be attached to the first and second clamping surfaces 15, 16. This will additionally provide some flexibility as to the size of the garment hanger 4 being clamped as well as increasing the effectiveness of the clamping and preventing the first and second clamping surfaces 15, 16 and garment hanger 4 from becoming damaged. The material 17 applied to the first and second clamping surfaces 15, 16 may be a polymer or a foam or another soft and deformable material.

Figure 4A:
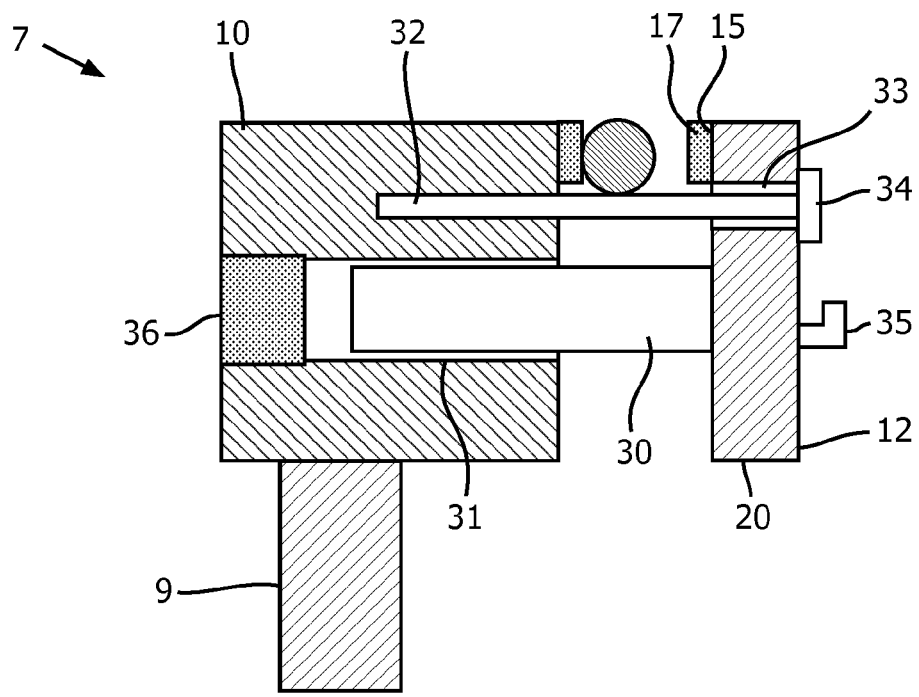
FIG. 4a shows a cross-section of a clamp of a third embodiment of a stand for supporting a garment hanger, with the clamp in an open position; and, FIG. 4b shows the clamp of the stand for supporting a garment hanger of FIG. 4a in a closed position.
Figure 4B:
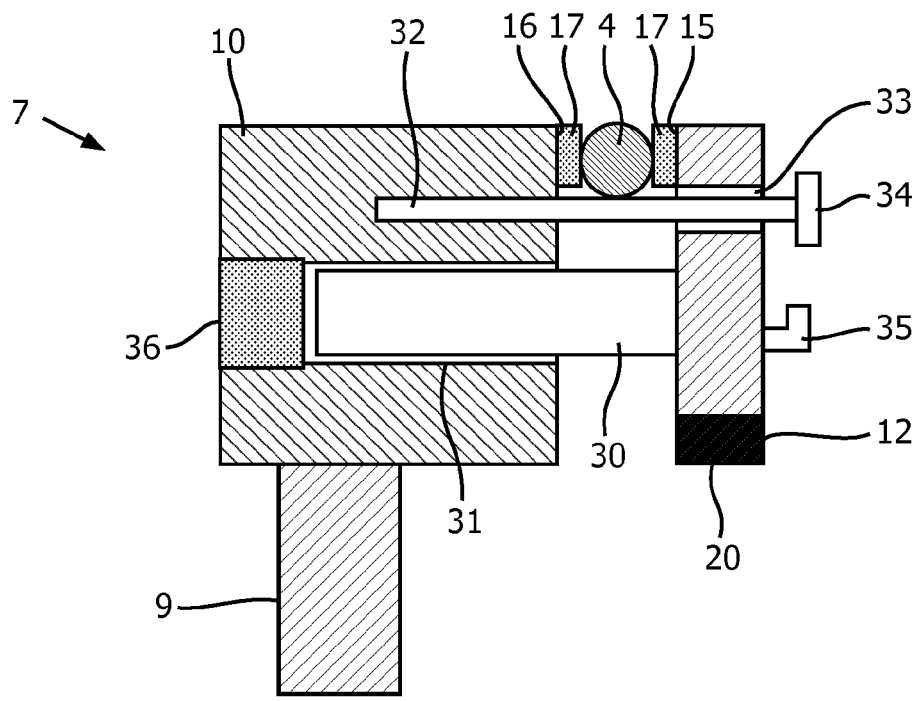

FIGS. 4a and 4b show another embodiment of the clamp for a stand. As with the previous embodiments, the clamp shown in FIGS. 4a and 4b has a clamp 8 with a body 10 which is mounted to an arm 9 of the stand 7. First and second clamping surfaces 15, 16 are defined on the clamp element 12 and body 10 respectively, and a garment hanger 4 can be clamped between the first and second clamping surfaces 15, 16 by moving the clamp element 12 relative to the body 10.

In particular, as shown in FIGS. 4a and 4b, the clamp element 12 of this embodiment comprises a shaft 30 that is fixably mounted to a plate 20 and slidably connected to the body 10 via an aperture 31 in the body 10. The clamp 8 also comprises a supporting element 32 that is fixably mounted to the body 10 and slidably connected to the plate 20 via an aperture 33 in the plate 20. In this way, the plate 20 is able to slide, relative to the body 10, and the shaft 30 will slide within the aperture 31 in the body 10, while the supporting element 32 will slide within the aperture 33 in the plate 20.

The supporting element 32 comprises a shoulder 34 which is disposed on the outer side of the plate 20 so that the clamp element 12 cannot be detached from the body 10. The clamp element 12, in particular the plate 20, has a handle 35 which allows a user to pull the clamp element 12 away from the body 10 for opening the clamp 8 by increasing the distance between the first and second clamping surfaces 15, 16. In alternative embodiment, the plate 20 may be formed in a shape which allows a user to grip the plate 20 itself, negating the need for a handle. For example, the plate 20 may be formed such that the side which comprises the first clamping surface 15 is smaller than the opposite side of the plate 20, which is disposed outwards towards a user. In this way, a user is able to grip the larger side of the plate 20 to pull the clamp element 12 away from the body 10, without the risk of the user's fingers or hands entering the space between the first and second clamping surfaces 15, 16.

In this embodiment, the shaft 30 of the clamp element 12 is made of, or contains, a magnetic material, and the clamp comprises a magnet 36 which is mounted in the body 10, in an end of the aperture 31 opposite to the clamp element 12. In this way, the magnet 36 acts to pull the shaft 30, and therefore also the clamp element 12, towards the body 10, reducing the distance between the first and second clamping surfaces 15, 16 to close the clamp.

The magnet 36 disposed in the body 10 may be permanent magnet or an electromagnet. The material of the shaft 30 may include at least some magnetic material or a magnet (not shown).

As shown in FIGS. 4a and 4b, the magnet 36 may be disposed at an end of the aperture 31 so that it is arranged to pull the shaft 30 into the aperture, thereby urging the clamp 8 towards a closed position. Alternatively, the magnet 36 may be arranged at the end of the aperture 31 adjacent to the second clamping surface 16 and the end of the shaft 30 may comprise a magnet or magnetic material. In this way, the magnet 36 acts to push the shaft 30 into the aperture 31. Either way, the magnet 36 urges the clamp 8 into a closed position by means of a magnetic force.

As shown in FIG. 4a, the clamp element 12 can be pulled away from the body 10, against the magnetic force, to open the clamp 8 and allow a garment hanger 4 to be positioned between the first and second clamping surfaces 15, 16. As shown, the supporting element 32 acts as a support for the garment hanger 4, which can be hung on the supporting element 32. As shown in FIG. 4b, when the clamp element 12 is released by the user the magnet 36 will pull the clamp element 12 back into the body 10 and thereby close the clamp 8 on the garment hanger 4.

As with the embodiments described with reference to FIGS. 2 to 3b, the first and second clamping surfaces 15, 16 may be provided with a surface coating or a material 17 may be attached to the first and second clamping surfaces 15, 16. This will additionally provide some flexibility as to the size of the garment hanger 4 being clamped as well as increasing the effectiveness of the clamping and preventing the first and second clamping surfaces 15, 16 and garment hanger 4 from becoming damaged. The material 17 applied to the first and second clamping surfaces 15, 16 may be a polymer or a foam or another soft and deformable material.

The embodiment described with reference to FIGS. 4a and 4b, with a magnet provided to urge the clamp element 12 towards a closed position, may additionally be provided with a locking element (not shown) that can be engaged to lock the clamp element 12 in a closed position and unlocked to allow the clamp element 12 to move relative to the body 10. The locking element may comprise a rotatable arm which extends from the clamp element 12 into the body 10 and comprises a knob such that a user can rotate the locking element between locked and unlocked positions. The end of the arm that extends into the body may comprise a cam part that can engage with a slot in the body 10 as the locking element is rotated. In the locked position the cam part engages with the slot and prevents the clamp element 12 from moving relative to the body 10, and in the unlocked position the cam part disengages from the slot in the body so that the clamp element 12 can move relative to the body 10. The locking element (not shown) described above can be used to ensure that the clamp 8 described with reference to FIGS. 4a and 4b remains in the closed position during use. The clamping force provided by the magnet 36 may be sufficient to clamp the garment hanger 4 in a fixed orientation. However, for some garments, in particular heavy garments, the force provided by the magnet 36 may be insufficient and in this case the locking element may be used to lock the clamp 8 in the closed position and secure the garment hanger 4.

The embodiments of the invention described with reference to FIGS. 2 to 4b allow any garment hanger 4 to be easily clamped to, and unclamped from, the stand 7. The clamping arrangement also allows a user to more rigorously handle, pull, steam and move a garment on the garment hanger 4 during steaming without the garment hanger 4 moving around or becoming detached from the stand 7.

Moreover, the garment does not need to be removed from the garment hanger and any garment hanger, for example one specific for the garment being steamed, can be used. This is advantageous when steaming different garments such as shirts, skirts or trousers. Also, it removes the need for the user to change the garment hanger 4 before and after steaming.

The embodiments of the stand 7 described with reference to FIGS. 2 to 4b may be freestanding and independent of the apparatus for steaming garments. Alternatively, the stand 7 may be integral to and extending from an apparatus for steaming garments, which may include a steam generator and a means for applying steam to a garment.

The embodiments of the invention described above relate to a garment steamer that includes a steam generator and steamer head for treating a garment with steam as it is supported on the stand by the clamp. However, it will be appreciated that the stand and the clamp may be provided to any apparatus for treating a garment where there is a need to support the garment in place during that treatment. For example, apparatus for washing a hung garment with water, apparatus for spraying a garment with a substance (e.g. disinfectant, clothes dye or other substance), or apparatus for drying a garment (e.g. by blowing air at a garment).

It will be appreciated that the term "comprising" does not exclude other elements or steps and that the indefinite article "a" or "an" does not exclude a plurality. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalisation thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived therefrom.

The invention claimed is:

1. A stand for supporting a garment hanger, comprising:
   a supporting element on which a garment hanger, selected from one of various sizes and thicknesses of garment hangers, can be hung; and
   a clamp that comprises a clamp body and a clamp element movable with respect to the clamp body between an open position and a closed position, wherein the clamp body and clamp element include respective first and second clamping surfaces, the first and second clamping surfaces being spaced apart in the open position and closer together in the closed position, wherein the supporting element is disposed intermediate the first and second clamping surfaces, and wherein the clamp is operable between the open position and the closed position to releasably support said garment hanger in a fixed orientation on the supporting element between the first and second clamping surfaces to prevent the garment hanger from moving around on the supporting element or becoming dislodged from the supporting element, in response to (i) said garment hanger being hung on said supporting element between the first and second clamping surfaces in the open position and (ii) a subsequent continuously adjustable movement of the first and second clamping surfaces closer together until the garment hanger is clamped in the fixed orientation on the supporting element between the first and second clamping surfaces in the closed position.

2. The stand of claim 1, wherein the clamp comprises a deformable material or surface coating disposed on the first and second clamping surfaces, wherein the deformable material or surface coating disposed on the first and second clamping surfaces deforms around a portion of the garment hanger being clamped.

3. The stand of claim 2, wherein the deformable material or surface coating disposed on the first and second clamping surfaces comprises at least one of a polymer, a foam, and other deformable material.

4. The stand of claim 1, wherein the clamp body and clamp element include a threaded protrusion configured to be engaged with a threaded hole, wherein the first and second clamping surfaces are moveable in response to (i) a rotation of the threaded protrusion relative to the threaded hole or (ii) a rotation of the threaded hole relative to the threaded protrusion.

5. The stand of claim 4, wherein a thread angle of the threaded protrusion and threaded hole is between 5 degrees and 9 degrees.

6. The stand of claim 1, wherein the clamp further comprises a shaft that protrudes from the clamp body and wherein the clamp element comprises a plate slidably mounted to the shaft such that the first and second clamping surfaces are moveable by sliding the plate along the shaft.

7. The stand of claim 6, wherein the clamp further comprises (i) an elastic element disposed intermediate the clamp body and the plate, wherein the elastic element is configured to urge the plate away from the clamp body, and (ii) a cam element disposed on an end of the shaft that extends beyond the plate, wherein the cam element comprises a cam surface configured to push the plate towards the clamp body in response to a rotation of the cam element.

8. The stand of claim 1, wherein the clamp further comprises a shaft that protrudes from the clamp element, wherein the clamp element includes a plate and wherein the shaft is slidably received in an aperture within the clamp body such that the first and second clamping surfaces are moveable by sliding the shaft into, and out of, the aperture.

9. The stand of claim 8, wherein the clamp body further comprises a magnet and the shaft comprises a magnetic material such that the plate is biased towards the closed position by a magnetic force.

10. The stand of claim 8, further comprising a locking element operable to lock the clamp in the closed position during use.

11. Apparatus for treating a garment comprising the stand of claim 1.

12. The apparatus of claim 11, wherein the apparatus for treating a garment is a garment steamer that further comprises a steam generator and a steamer head or nozzle for applying steam to a garment.

13. A stand for supporting a garment hanger, comprising:
a supporting element on which a garment hanger, selected from one of various sizes and thicknesses of garment hangers, can be hung; and
a clamp that comprises first and second clamping surfaces movable with respect to each other between an open position and a closed position, the first and second clamping surfaces being spaced apart in the open position and closer together in the closed position, wherein the supporting element is disposed intermediate the first and second clamping surfaces, and wherein the clamp is operable between the open position and the closed position to releasably support said garment hanger in a fixed orientation on the supporting element between the first and second clamping surfaces to prevent the garment hanger from moving around on the supporting element or becoming dislodged from the supporting element, in response to (i) said garment hanger being hung on said supporting element between the first and second clamping surfaces in the open position and (ii) a subsequent continuously adjustable movement of the first and second clamping surfaces closer together until the garment hanger is clamped in the fixed orientation on the supporting element between the first and second clamping surfaces in the closed position.

14. The stand of claim 13, wherein the clamp comprises a deformable material or surface coating disposed on the first and second clamping surfaces, wherein the deformable material or surface coating disposed on the first and second clamping surfaces deforms around a portion of the garment hanger being clamped.

15. The stand of claim 13, wherein the deformable material or surface coating disposed on the first and second clamping surfaces comprises at least one of a polymer, a foam, and other deformable material.

16. The stand of claim 13, wherein the clamp comprises a threaded protrusion configured to be engaged with a threaded hole, wherein the first and second clamping surfaces are moveable in response to (i) a rotation of the threaded protrusion relative to the threaded hole or (ii) a rotation of the threaded hole relative to the threaded protrusion.

17. The stand of claim 16, wherein a thread angle of the threaded protrusion and threaded hole is between 5 degrees and 9 degrees.

18. The stand of claim 13, wherein the clamp further comprises (i) a shaft that protrudes from a body of the clamp and (ii) a plate slidably mounted to the shaft such that the first and second clamping surfaces are moveable by sliding the plate along the shaft.

19. The stand of claim 18, wherein the clamp further comprises (i) an elastic element disposed intermediate the body and the plate, wherein the elastic element is configured to urge the plate away from the body, and (ii) a cam element disposed on an end of the shaft that extends beyond the plate, wherein the cam element comprises a cam surface configured to push the plate towards the body in response to a rotation of the cam element.

20. The stand of claim 13, wherein the clamp further comprises a shaft that protrudes from a plate and wherein the shaft is slidably received in an aperture within a body of the clamp such that the first and second clamping surfaces are moveable by sliding the shaft into, and out of, the aperture, and wherein the body further comprises a magnet and the shaft comprises a magnetic material such that the plate is biased towards the closed position by a magnetic force.

* * * * *